United States Patent
Iyer et al.

(10) Patent No.: US 12,137,156 B2
(45) Date of Patent: *Nov. 5, 2024

(54) PHYSICAL LAYER TO LINK LAYER INTERFACE AND RELATED SYSTEMS, METHODS AND DEVICES

(71) Applicant: Microchip Technology Incorporated, Chandler, AZ (US)

(72) Inventors: Venkat Iyer, Austin, TX (US); Dixon Chen, Guangdong (CN); John Junling Zang, Guangdong (CN); Shivanand I. Akkihal, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,384

(22) Filed: Aug. 30, 2022

(65) Prior Publication Data

US 2022/0416992 A1 Dec. 29, 2022

Related U.S. Application Data

(63) Continuation of application No. 16/653,688, filed on Oct. 15, 2019, now Pat. No. 11,431,468.

(30) Foreign Application Priority Data

Aug. 29, 2019 (CN) .......................... 201910785147.9

(51) Int. Cl.
*H04L 7/00* (2006.01)
*H04L 69/323* (2022.01)

(52) U.S. Cl.
CPC .......... *H04L 7/0041* (2013.01); *H04L 69/323* (2013.01)

(58) Field of Classification Search
CPC ..................................................... H04L 7/0041
See application file for complete search history.

(56) References Cited

U.S. PATENT DOCUMENTS

| 4,596,011 | A | 6/1986 | Kobayashi et al. |
| 4,739,276 | A | 4/1988 | Graube |
| 4,970,466 | A | 11/1990 | Bolles et al. |

(Continued)

FOREIGN PATENT DOCUMENTS

| CN | 1426650 A | 6/2003 |
| CN | 1547860 A | 11/2004 |

(Continued)

OTHER PUBLICATIONS

Chinese Office Action and Search Report from Chinese Application No. 201910784382.4, dated Mach 3, 2022, 19 pages.

(Continued)

*Primary Examiner* — Abdeltif Ajid
(74) *Attorney, Agent, or Firm* — TraskBritt (57) ABSTRACT

Disclosed embodiments relate, generally, to improved data reception handling at a physical layer. Some embodiments relate to end of line systems that include legacy media access control (MAC) devices and PHY devices that implement improved data reception handling disclosed herein. The improved data reception handling improves the operation of legacy systems, and the MAC more specifically, and in some cases to comply with media access tuning protocols implemented at the physical layer.

15 Claims, 7 Drawing Sheets

(56) References Cited

U.S. PATENT DOCUMENTS

| | | |
|---|---|---|
| 5,134,377 A | 7/1992 | Reddy et al. |
| 5,305,459 A | 4/1994 | Rydel |
| 5,357,145 A | 10/1994 | Segaram |
| 5,381,348 A | 1/1995 | Ernst et al. |
| 5,581,556 A | 12/1996 | Ohie |
| 5,784,573 A | 7/1998 | Szczepanek et al. |
| 5,859,554 A | 1/1999 | Higashisaka et al. |
| 5,892,893 A | 4/1999 | Hanf et al. |
| 6,029,202 A | 2/2000 | Frazier et al. |
| 6,067,408 A | 5/2000 | Runaldue et al. |
| 6,115,831 A | 9/2000 | Hanf et al. |
| 6,185,195 B1 | 2/2001 | Leung |
| 6,192,422 B1 | 2/2001 | Daines et al. |
| 6,215,816 B1 | 4/2001 | Gillespie et al. |
| 6,459,739 B1 | 10/2002 | Vitenberg |
| 6,463,543 B1 | 10/2002 | Alvarez |
| 6,479,983 B1 | 11/2002 | Ebiya |
| 6,633,577 B1 | 10/2003 | Nyu |
| 6,691,241 B1 | 2/2004 | Taylor |
| 6,735,217 B1 | 5/2004 | Webber et al. |
| 6,920,132 B1 | 7/2005 | Lo |
| 6,973,094 B1 | 12/2005 | Holloway et al. |
| 7,110,423 B1 | 9/2006 | Sethuram et al. |
| 7,319,705 B1 | 1/2008 | Wu et al. |
| 7,420,986 B1 | 9/2008 | Howard et al. |
| 7,558,348 B1 | 7/2009 | Liu et al. |
| 7,808,247 B1 | 10/2010 | Lo |
| 7,906,973 B1 | 3/2011 | Orr |
| 8,243,752 B2 | 8/2012 | Barkan et al. |
| 8,935,125 B1 | 1/2015 | Fu et al. |
| 9,454,212 B1 | 9/2016 | Schulze |
| 9,628,082 B1 | 4/2017 | Smith et al. |
| 9,696,361 B1 | 7/2017 | Sun et al. |
| 10,102,693 B1 | 10/2018 | Wu |
| 10,684,977 B1 | 6/2020 | Seger et al. |
| 10,863,386 B1 | 12/2020 | Anand et al. |
| 11,121,782 B2 | 9/2021 | Zang et al. |
| 11,197,322 B2 | 12/2021 | Iyer et al. |
| 11,218,964 B2 | 1/2022 | Chae et al. |
| 2002/0162038 A1 | 10/2002 | Bullman et al. |
| 2003/0061341 A1 | 3/2003 | Loh et al. |
| 2003/0126486 A1 | 7/2003 | Bui |
| 2003/0200306 A1 | 10/2003 | Park et al. |
| 2003/0225802 A1 | 12/2003 | Ruthstein et al. |
| 2003/0226050 A1 | 12/2003 | Yik et al. |
| 2004/0028164 A1 | 2/2004 | Jiang et al. |
| 2004/0047367 A1 | 3/2004 | Mammen |
| 2004/0145500 A1 | 7/2004 | Huebl |
| 2004/0240598 A1 | 12/2004 | Yin |
| 2004/0251912 A1 | 12/2004 | Pharn et al. |
| 2005/0058452 A1 | 3/2005 | Kramer et al. |
| 2005/0063116 A1 | 3/2005 | Rotheroe |
| 2005/0078683 A1 | 4/2005 | Page |
| 2005/0128826 A1 | 6/2005 | Kwack et al. |
| 2006/0007991 A1 | 1/2006 | Wang et al. |
| 2006/0109784 A1 | 5/2006 | Weller et al. |
| 2006/0152261 A1 | 7/2006 | Lance |
| 2006/0181283 A1 | 8/2006 | Wajcer et al. |
| 2006/0209710 A1 | 9/2006 | Watanabe |
| 2006/0222129 A1 | 10/2006 | Hadzic et al. |
| 2007/0008011 A1 | 1/2007 | Thurston |
| 2007/0013411 A1 | 1/2007 | Asaduzzaman et al. |
| 2007/0069768 A1 | 3/2007 | Hatooka et al. |
| 2007/0121624 A1 | 5/2007 | Kimbrough et al. |
| 2007/0133586 A1 | 6/2007 | Ojard et al. |
| 2007/0160087 A1 | 7/2007 | Findlater et al. |
| 2008/0024178 A1 | 1/2008 | Kim et al. |
| 2008/0037693 A1 | 2/2008 | Andrus et al. |
| 2008/0117810 A1 | 5/2008 | Stott et al. |
| 2008/0159330 A1 | 7/2008 | Deng et al. |
| 2008/0162682 A1 | 7/2008 | Ramachandran et al. |
| 2008/0186996 A1 | 8/2008 | Powell et al. |
| 2009/0003835 A1 | 1/2009 | Arahira |
| 2009/0201936 A1 | 8/2009 | Dumet et al. |
| 2010/0164505 A1 | 7/2010 | Breed et al. |
| 2010/0202436 A1 | 8/2010 | Albert et al. |
| 2010/0246693 A1 | 9/2010 | Ushio et al. |
| 2010/0322105 A1 | 12/2010 | Diab |
| 2011/0022699 A1 | 1/2011 | Powell et al. |
| 2011/0028104 A1 | 2/2011 | Giombanco et al. |
| 2011/0051601 A1 | 3/2011 | Linsky et al. |
| 2011/0170476 A1 | 7/2011 | Shapira et al. |
| 2012/0087662 A1 | 4/2012 | Suzuki et al. |
| 2012/0155476 A1 | 6/2012 | Pavani et al. |
| 2012/0229214 A1 | 9/2012 | Kasanyal |
| 2012/0300710 A1 | 11/2012 | Li et al. |
| 2012/0307637 A1 | 12/2012 | Diab |
| 2013/0007480 A1 | 1/2013 | Wertheimer et al. |
| 2013/0021063 A1 | 1/2013 | Kwon |
| 2013/0101058 A1 | 4/2013 | Hummel |
| 2013/0159489 A1 | 6/2013 | Cha et al. |
| 2013/0162300 A1 | 6/2013 | Liu et al. |
| 2013/0229926 A1 | 9/2013 | Lu et al. |
| 2013/0329773 A1 | 12/2013 | Cheng et al. |
| 2014/0073352 A1 | 3/2014 | Aldana et al. |
| 2014/0133496 A1 | 5/2014 | Sugiura et al. |
| 2014/0177653 A1 | 6/2014 | Tzeng |
| 2014/0268141 A1 | 9/2014 | Pariseau |
| 2014/0269758 A1 | 9/2014 | Sutterlin et al. |
| 2014/0281626 A1 | 9/2014 | Younger et al. |
| 2015/0063375 A1 | 3/2015 | Tzeng et al. |
| 2015/0124797 A1 | 5/2015 | Babitch et al. |
| 2015/0131708 A1 | 5/2015 | Cornett et al. |
| 2015/0145563 A1 | 5/2015 | Pardoen |
| 2015/0145581 A1 | 5/2015 | Palmer et al. |
| 2015/0205339 A1 | 7/2015 | Park et al. |
| 2015/0237178 A1 | 8/2015 | Zhang |
| 2015/0370312 A1 | 12/2015 | Desposito et al. |
| 2016/0094362 A1 | 3/2016 | Brennan |
| 2016/0156458 A1 | 6/2016 | Babitch et al. |
| 2016/0323287 A1 | 11/2016 | Kishikawa et al. |
| 2016/0337138 A1 | 11/2016 | Gardner et al. |
| 2017/0046298 A1 | 2/2017 | Yu et al. |
| 2017/0048887 A1 | 2/2017 | Feng |
| 2017/0111069 A1 | 4/2017 | Dafesh et al. |
| 2017/0134152 A1 | 5/2017 | Yamamoto et al. |
| 2017/0187479 A1 | 6/2017 | Yamamoto et al. |
| 2017/0214513 A1 | 7/2017 | Asada et al. |
| 2017/0222685 A1 | 8/2017 | Khan et al. |
| 2017/0257273 A1 | 9/2017 | Li et al. |
| 2017/0308946 A1 | 10/2017 | Bursey |
| 2017/0310541 A1 | 10/2017 | Jin |
| 2017/0346620 A1 | 11/2017 | Bucci et al. |
| 2018/0034658 A1 | 2/2018 | Kinage et al. |
| 2018/0062821 A1 | 3/2018 | Mamidwar et al. |
| 2018/0091251 A1 | 3/2018 | Hanneman, Jr. |
| 2018/0165056 A1 | 6/2018 | Lay et al. |
| 2018/0181525 A1 | 6/2018 | Iyer et al. |
| 2018/0220161 A1 | 8/2018 | Schierl et al. |
| 2018/0227015 A1 | 8/2018 | McCormack et al. |
| 2018/0262526 A1 | 9/2018 | Jain et al. |
| 2018/0314285 A1 | 11/2018 | Susanto et al. |
| 2018/0331776 A1 | 11/2018 | Wang et al. |
| 2019/0179398 A1 | 6/2019 | Arora et al. |
| 2019/0199537 A1 | 6/2019 | Seo et al. |
| 2019/0230705 A1* | 7/2019 | Beruto .......... H04J 3/0652 |
| 2019/0261420 A1 | 8/2019 | Pannell et al. |
| 2019/0268452 A1 | 8/2019 | Yu et al. |
| 2019/0268941 A1 | 8/2019 | Axer et al. |
| 2019/0313446 A1 | 10/2019 | Kim et al. |
| 2019/0342394 A1 | 11/2019 | McCann et al. |
| 2019/0357146 A1 | 11/2019 | Kim et al. |
| 2019/0361711 A1 | 11/2019 | Kim et al. |
| 2019/0363991 A1 | 11/2019 | Sostawa et al. |
| 2019/0385057 A1 | 12/2019 | Litichever et al. |
| 2020/0067727 A1 | 2/2020 | Pannell |
| 2020/0136993 A1 | 4/2020 | Yun et al. |
| 2020/0145263 A1 | 5/2020 | Gotz |
| 2020/0153174 A1 | 5/2020 | Curtis et al. |
| 2020/0295957 A1 | 9/2020 | Kim et al. |
| 2020/0343993 A1 | 10/2020 | Rentschler et al. |
| 2020/0351943 A1 | 11/2020 | Iyer et al. |
| 2020/0367096 A1 | 11/2020 | Hwang et al. |
| 2020/0371579 A1 | 11/2020 | Selvam et al. |

(56) References Cited

U.S. PATENT DOCUMENTS

| | | |
|---|---|---|
| 2021/0055963 A1 | 2/2021 | An et al. |
| 2021/0056060 A1 | 2/2021 | An et al. |
| 2021/0058168 A1 | 2/2021 | Zang et al. |
| 2021/0058177 A1 | 2/2021 | Iyer et al. |
| 2021/0058224 A1 | 2/2021 | Iyer et al. |
| 2021/0058269 A1 | 2/2021 | Zang et al. |
| 2021/0058498 A1 | 2/2021 | Iyer et al. |
| 2021/0058965 A1 | 2/2021 | Chen et al. |
| 2021/0067907 A1 | 3/2021 | Sze et al. |
| 2021/0282087 A1 | 9/2021 | Den Besten |
| 2021/0303050 A1 | 9/2021 | Ching et al. |
| 2022/0046114 A1 | 2/2022 | Entelis et al. |

FOREIGN PATENT DOCUMENTS

| | | |
|---|---|---|
| CN | 101127928 A | 2/2008 |
| CN | 101566665 A | 10/2009 |
| CN | 101616048 A | 12/2009 |
| CN | 102017778 A | 4/2011 |
| CN | 1866803 B | 5/2012 |
| CN | 102813530 A | 12/2012 |
| CN | 102891702 A | 1/2013 |
| CN | 204392278 U | 6/2015 |
| CN | 105681148 A | 6/2016 |
| CN | 106031098 A | 10/2016 |
| CN | 106603310 A | 4/2017 |
| CN | 107836131 A | 3/2018 |
| CN | 108173703 A | 6/2018 |
| CN | 108781091 A | 11/2018 |
| CN | 115685034 A | 2/2023 |
| DE | 102018105007 A1 | 9/2019 |
| DE | 112019002669 T5 | 3/2021 |
| DE | 112020002093 T5 | 1/2022 |
| EP | 0620664 | 10/1994 |
| EP | 1388975 A1 | 2/2004 |
| EP | 1940086 A1 | 7/2008 |
| EP | 2779535 A1 | 9/2014 |
| EP | 2816501 A1 | 12/2014 |
| EP | 3094044 A1 | 11/2016 |
| EP | 3573287 A1 | 11/2019 |
| EP | 3618364 A1 | 3/2020 |
| GB | 1351654 A | 5/1974 |
| JP | 58-131848 A | 8/1983 |
| JP | 59-158148 A | 9/1984 |
| JP | S63-304727 A | 12/1988 |
| JP | 01-260949 A | 10/1989 |
| JP | H03-006944 A | 1/1991 |
| JP | 04-072937 A | 3/1992 |
| JP | 2002-507365 A | 3/2002 |
| JP | 2003-125024 A | 4/2003 |
| JP | 2003-318911 A | 11/2003 |
| JP | 2004-517558 A | 6/2004 |
| JP | 2005-136979 A | 5/2005 |
| JP | 2005-531953 A | 10/2005 |
| JP | 2007-028619 A | 2/2007 |
| JP | 2007-521758 A | 8/2007 |
| JP | 2008-039532 A | 2/2008 |
| JP | 2009-021651 A | 1/2009 |
| JP | 2009-219021 A | 9/2009 |
| JP | 2010-226406 A | 10/2010 |
| JP | 2011-052936 A | 3/2011 |
| JP | 2011-193039 A | 9/2011 |
| JP | 2013-024614 A | 2/2013 |
| JP | 2013-527643 A | 6/2013 |
| JP | 2013-200687 A | 10/2013 |
| JP | 2015-126303 A | 7/2015 |
| JP | 2018-042019 A | 3/2018 |
| NL | 7113537 A | 4/1972 |
| RU | 2020570 C1 | 9/1994 |
| WO | 1994/016303 A1 | 7/1994 |
| WO | 2018/136116 A1 | 7/2018 |

OTHER PUBLICATIONS

Chinese Office Action and Search Report from Chinese Application No. 201910784580.0, dated Mar. 7, 2022, 18 pages.
Chinese Office Action and Search Report from Chinese Application No. 201910784657.4, dated Nov. 30, 2021, 13 pages.
Chinese Office Action and Search Report from Chinese Application No. 201910785147.9, dated Oct. 29, 2021, 11 pages.
Fitzgerald: "10BASE-T1L Low Power Idle (802.3cg D2.0)", IEEE—SA, Acuitas Silicon, (Aug. 15, 2018) 9 pages.
German Office Action from German Application No. 112020002209.9, dated Mar. 17, 2022, 34 pages.
International Search Report from International Application No. PCT/US2020/0070363, mailed Nov. 10, 2020, 5 pages.
International Written Opinion from International Application No. PCT/US2020/0070363, mailed Nov. 10, 2020, 9 pages.
LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.
Meier, "Analysis of Worst Case Latencies in an 10 Mbit Ethernet network with PLCA", IEEE Draft, V4, Jan. 17, 2018, pp. 1-11.
Microchip KSZ8061MNX/MNG, "100BASE-T/100BASE-TX Physical Layer Transceiver" Device Document 00002038D (Aug. 15, 2018) 66 pages.
Microsoft. "P." Microsoft Computer Dictionary, 5th ed., Penguin Books, 2002. (Year: 2002).
Pannell et al., "Quality of Service for PLCA", NXP, May 2018 (May 24, 2018), pp. 1-37, vol. 802.1, No. v02 24, Pittsburg.
U.S. Appl. No. 16/587,505, filed Sep. 30, 2019, titled "Detecting Collisions on a Network", to Zang et al., 34 pages.
U.S. Appl. No. 16/587,583, filed Sep. 30, 2019, titled "Interface for Improved Media Access, and Related Systems, Methods, and Devices", to Chen et al., 51 pages.
U.S. Appl. No. 16/588,562, filed Sep. 30, 2019, titled "Transceiver and Driver Architecture With Low Emission and High Interference Tolerance", to An et al., 36 pages.
U.S. Appl. No. 16/588,714, filed Sep. 30, 2019, titled "Diagnosing Cable Faults Within a Network", to Zang et al., 40 pages.
U.S. Appl. No. 16/591,294, filed Oct. 2, 2019, titled "Wake Detection At Controller for Physical Layer of Single Pair Ethernet Network, and Related Systems, Methods and Devices", to An et al., 31 pages.
U.S. Appl. No. 16/653,688, filed Oct. 15, 2019, titled "Physical Layer to Link Layer Interface and Related Systems, Methods and Devices", to Iyer et al., 32 pages.
U.S. Appl. No. 16/684,419, filed Nov. 14, 2019, titled "Ethernet Interface and Related Systems Methods and Devices", to Iyer et al., 23 pages.
U.S. Appl. No. 16/684,428, filed Nov. 14, 2019, titled "Ethernet Interface and Related Systems Methods and Devices", to Iyer et al., 30 pages.
U.S. Appl. No. 16/843,648, filed Apr. 8, 2020, titled "Emulating Collisions in Wired Local Area Networks and Related Systems, Methods, and Devices", to Iyer et al., 53 pages.
U.S. Appl. No. 62/881,720, filed Aug. 1, 2019, titled "Single Pair Ethernet Physical Layer Architecture and Systems, Devices, and Me I Hods for Implementing the Same", to Iyer et al., 35 pages.
U.S. Appl. No. 62/993,825, filed Mar. 24, 2020, titled "Low Pin Count Handshake Signaling Protocol According To 10BASE-T1X Local and Remote Wake De I Ect and Related Systems, Me I Hods, and Devices", to Iyer et al., 13 pages.
Zimmerman et al., "IEEE P802.3cg 10Mb/s Single Pair Ethernet: A guide", Long Beach, CA, USA, Jan. 16, 2019. (Year: 2019).
Chinese First Office Action and Search Report for Chinese Patent Application Serial No. 201910784058.2, issued Nov. 7, 2023, 40 pages with English translation.
Chinese First Office Action for Chinese Application No. 201910784565.6, dated Sep. 8, 2023, 27 pages with English translation.
Chinese First Office Action for Chinese Application No. 201910785140.7, dated May 31, 2023, 17 pages with English translation.

(56) References Cited

OTHER PUBLICATIONS

Chinese First Office Action for Chinese Application No. 202210842861.9, dated Aug. 30, 2023, 15 pages with English translation.
Chinese Second Office Action for Chinese Application No. 201910785140.7, dated Oct. 25, 2023, 10 pages with English translation.
Korean Notice of Provisional Rejection for Korean Application No. 10-2022-7009593, dated Jul. 4, 2023, 17 pages with English translation.
Korean Request for the Submission of an Opinion for Korean Patent Application No. 10-2022-7005572, mailed Jan. 26, 2024, 21 pages with English translation.
Notice of Reasons for Refusal for Japanese Patent Application No. 2022-510900, issued Sep. 5, 2023, 10 pages with English translation.
The Second Office Action of Chinese Patent Application No. 202210842861.9, issued Feb. 9, 2024, 15 pages with English translation.
Beruto, Piergiorgio et al., 802.3cg draft 2.0 PLCA (Clause 148) Overview, IEEE 802,3 Plenary Meeting, Jul. 9, 2018, 23 pages.
Japanese Notice of Reasons for Refusal of Japanese Patent Application No. 2022-557156, mailed Apr. 16, 2024, 4 pages with English translation.
Korean Request for the Submission of an Opinion of Korean Application No. 10-2021-7037128, issued Feb. 16, 2024, 10 pages with English translation.
Korean Request for the Submission of an Opinion of Korean Patent Application No. 10-2022-7007012, issued Feb. 23, 2024, 12 pages with English translation.
Notice of Reasons for Refusal of Japanese Patent Application No. 2021-565015, issued Apr. 30, 2024, 5 pages with English translation.
Notification to Grant Patent Right for Invention and Search Report of Chinese Patent Application No. 201910784058.2, issued May 1, 2024, 11 pages with English translation.
Qiming et al., Power cable partial discharge fault location based on high-speed sampling device, Electronic Technology Applications, vol. 41, Issue 8, 2015, pp. 70-75, 8 total pages with English translation.
IEEE Draft Standard for Ethernet—Amendment 4: Physical Layer Specifications and Management Parameters for 10 Mb/s Operation and Associated Power Delivery over a Single Balanced Pair of Conductors, LAN/MAN Standards Committee of IEEE Computer Society, Jul. 18, 2019, 5 pages.
Notice of Reasons for Refusal of Japanese Patent Application No. 2022-510903, mailed Jun. 18, 2024, 12 pages with English translation.
Second Office Action of Chinese Patent Application No. 201910784565.6, issued Jun. 8, 2024, 24 pages with English translation.
Draft Standard for Ethernet Amendment 4: Physical Layer Specifications and Management Parameters for 10Mb/s Operation and Associated Power Delivery over a Single Balanced Pair of Conductors, LAN/MAN Standards Committee of the IEEE Computer Society, IEEE P802.3cg, Jul. 18, 2019, pp. 1-3, 234, 235.
Notice of Reasons for Refusal of Japanese Patent Application No. 2022-510899, mailed Jul. 30, 2024, 8 pages with English translation.
Notice of Reasons for Refusal of Japanese Patent Application No. 2022-510905, issued Jul. 2, 2024, 12 pages with English translation.
Notice of Reasons for Refusal of Japanese Patent Application No. 2022-510907, issued Jul. 2, 2024, 12 pages with English translation.
Notice of Reasons for Refusal of Japanese Patent Application No. 2022-510908, issued Aug. 6, 2024, 15 pages with English translation.
Notice of Reasons for Refusal of Japanese Patent Application No. 2022-510909, issued Jul. 16, 2024, 8 pages with English translation.
Request for the Submission of an Opinion of Korean Patent Application No. 10-2022-7005576, issued Aug. 7, 2024, 12 pages with English translation.
Request for the Submission of an Opinion of Korean Patent Application No. 10-2022-7007928, mailed Aug. 19, 2024, 11 pages with English translation.
Request for the Submission of an Opinion of Korean Patent Application No. 10-2022-7009586, issued Aug. 26, 2024, 11 pages with English translation.
Request for the Submission of an Opinion of Korean Patent Application No. 10-2022-7009587, issued Jun. 20, 2024, 21 pages with English translation.
Request for the Submission of an Opinion of Korean Patent Application No. 10-2022-7009588, mailed Aug. 27, 2024, 11 pages with English translation.

* cited by examiner

PHYSICAL LAYER TO LINK LAYER INTERFACE AND RELATED SYSTEMS, METHODS AND DEVICES

CROSS-REFERENCE TO RELATED APPLICATIONS

This application is a continuation of U.S. patent application Ser. No. 16/653,688, filed Oct. 15, 2019, which will issue as U.S. Pat. No. 11,431,468 on Aug. 30, 2022, which claims the benefit of the filing date of Chinese Provisional Patent Application Serial No. 201910785147.9, filed Aug. 23, 2019, for "PHYSICAL LAYER TO LINK LAYER INTERFACE AND RELATED SYSTEMS, METHODS AND DEVICES," the disclosure of each of which is hereby incorporated herein in its entirety by this reference.

TECHNICAL FIELD

Disclosed embodiments relate, generally, to improved data reception handling at a physical layer. Some embodiments relate to PHY devices configured to implement improved data reception handling that, in some cases, facilitates improved data reception handling at legacy media access control (MAC).

BACKGROUND

Interconnects are widely used to facilitate communication among devices of a network. Generally speaking, electrical signals are transmitted on a physical medium (e.g., a bus, a coaxial cable, or a twisted pair—but generally referred to simply as a "line") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component Interconnect (PCI) standard and the Parallel Advanced Technology Attachment (Parallel ATA), both around since the early 1990's, may implement a multi-drop bus topology. The trend since the early 2000's has been to use point-to-point bus topologies, for example, the PCI Express standard and the Serial ATA (SATA) standard implement point-to-point topologies.

A typical point-to-point bus topology may implement lines between each device (e.g., dedicated point-to-point) or lines between devices and switches (e.g., switched point-to-point, without limitation). In a multi-drop topology, a physical medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multi-drop topologies due, in part, to the greater number of links between devices. In certain applications, such as automotive, there may be physical constraints that make it difficult to directly connect devices, and so a topology that does not require, or does not require as many, direct connections (e.g., a multi-drop topology, without limitation) in a network or a sub-network may be less susceptible to such constraints.

Devices that are on a baseband network (e.g., a multi-drop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are used to handle contention for a shared transmission medium.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In disclosed embodiments, unless otherwise stated a collision should be understood to refer to a logical collision (i.e., an actual collision is predicted but two nodes do not actually transmit signals on a shared transmission medium at the same time).

Protocols may be performed at a physical layer for media access tuning. As a non-limiting example, 10SPE (i.e., 10 Mbps Single Pair Ethernet) is a network technology specification currently under development by the Institute of Electrical and Electronics Engineers (IEEE) as IEEE 802.3cg™, and the specification includes an optional physical layer collision avoidance (PLCA) reconciliation sublayer, which, in theory, may be used to avoid collisions on a multi-drop bus. Other media access tuning protocols may be implemented in a PHY including time aware protocols and traffic shaping protocols.

Generally speaking, one advantage of performing media access tuning is that a MAC can still receive data after a collision is detected, at least in part, because the receive data that caused a collision (characterized another way, the data that was part of a collision packet) is not corrupted by transmit data. However, some legacy MACs assume that any collision is an actual collision and are configured to back off and ignore any receive data on a receive data line after a collision.

Some embodiments of this disclosure relate, generally, to a process for improved handling of a data reception after a collision that accounts for behavior of some legacy MACs, and related systems, methods and devices.

Figure 1:
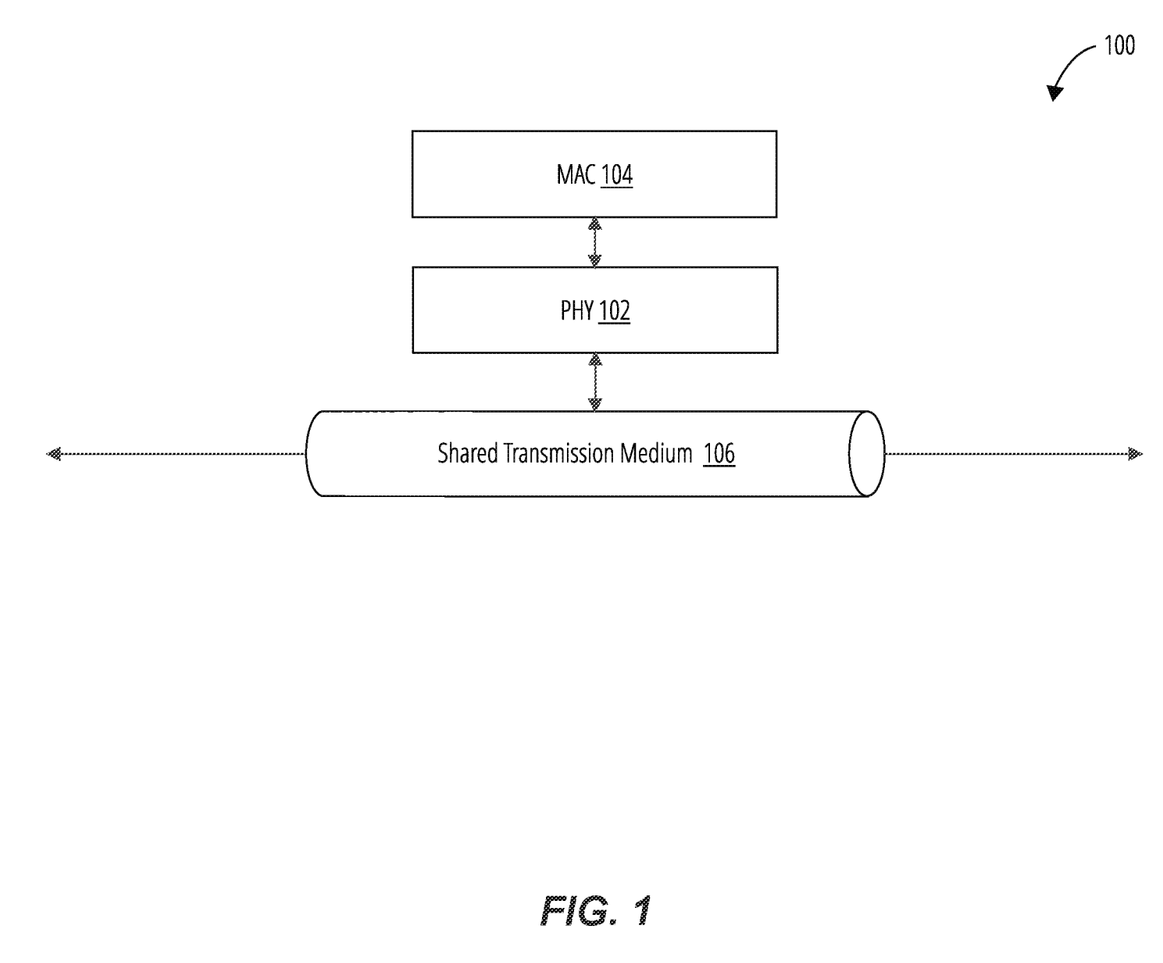
FIG. 1 illustrates a network segment in accordance with one or more embodiments.

FIG. 1 shows a functional block diagram of a network segment 100 including a link layer device, MAC 104, and a physical layer (PHY) device, PHY 102. As non-limiting examples, network segment 100 may be a segment of a multi-drop network, a segment of a multi-drop sub-network, a segment of a mixed media network, or a combination or sub-combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation), elevator system or sub-system, public transit control system (e.g., for above ground train, below ground train, trolley, or bus, without limitation), an automobile system or automobile sub-system, or an industrial control system, without limitation.

As shown in FIG. 1, PHY 102 may be configured to interface with MAC 104. As non-limiting examples, PHY 102 and/or MAC 104 may be chip packages including memory and/or logic configured for carrying out all or portions of embodiments described herein. As non-limiting examples, PHY 102 and MAC 104, respectively, may be implemented as separate chip packages or circuitry (e.g., integrated circuits) in a single chip package (e.g., a system-in-a-package (SIP)).

As shown in FIG. 1, PHY 102 may also be configured to interface with shared transmission medium 106, a physical medium that is a communication path for nodes that are part of network segment 100 or a network of which network segment 100 is a part, including nodes that include respective PHY 102 and MAC 104. As a non-limiting example, shared transmission medium 106 may be a single twisted pair such as used for single pair Ethernet.

In one or more embodiments, MAC 104 may be configured to be traffic aware, and more specifically, may be configured to implement collision detection and/or avoidance protocols. In one or more embodiments, MAC 104 may be configured to perform carrier-sense multiple access (CSMA). More specifically, MAC 104 may be configured to check for a carrier on shared transmission medium 106, and if it detects a carrier then it is configured to wait until no carrier is detected (i.e., the channel is idle) before beginning a data transmission.

In one or more embodiments, MAC 104 may be configured to perform CSMA with collision detection (CSMA/CD). In one embodiment, MAC 104 is configured to respond to a detected collision after beginning a data transmission by transmitting a short sequence of symbols (sometimes referred to as a jam sequence), and then backing off from transmitting or receiving for a period of time. MAC 104 is configured to ignore any data on a receive data line (i.e., receive data) while it is backing off because MAC 104 is configured to assume a detected collision is an actual collision in contrast to a logical collision. In a case of an actual collision, receive data would be corrupted. However, in a case of a logical collision, receive data on shared transmission medium 106 is, in theory, not corrupted because there is no actual collision. Accordingly, it is inefficient for MAC 104 to ignore a clean packet (i.e., a packet not corrupted by a transmit packet). Moreover, according to some network standards, such as IEEE 802.3cg™, since transmissions are determinant, it is assumed that a MAC will receive a data packet that caused a detected collision. However, some legacy MACs will ignore the receive data of a collision packet and so may exhibit behavior that does not comply with such a standard.

In one or more embodiments, PHY 102 may be configured to perform media access tuning, and more specifically, to perform one or more of PLCA, time aware protocols, and traffic shaping, without limitation. In one or more embodiments, PHY 102 may be configured to perform data reception handling and signal tuning to tune one or more signals used by MAC 104 to perform CSMA/CD, as described more fully in this disclosure.

Figure 2:
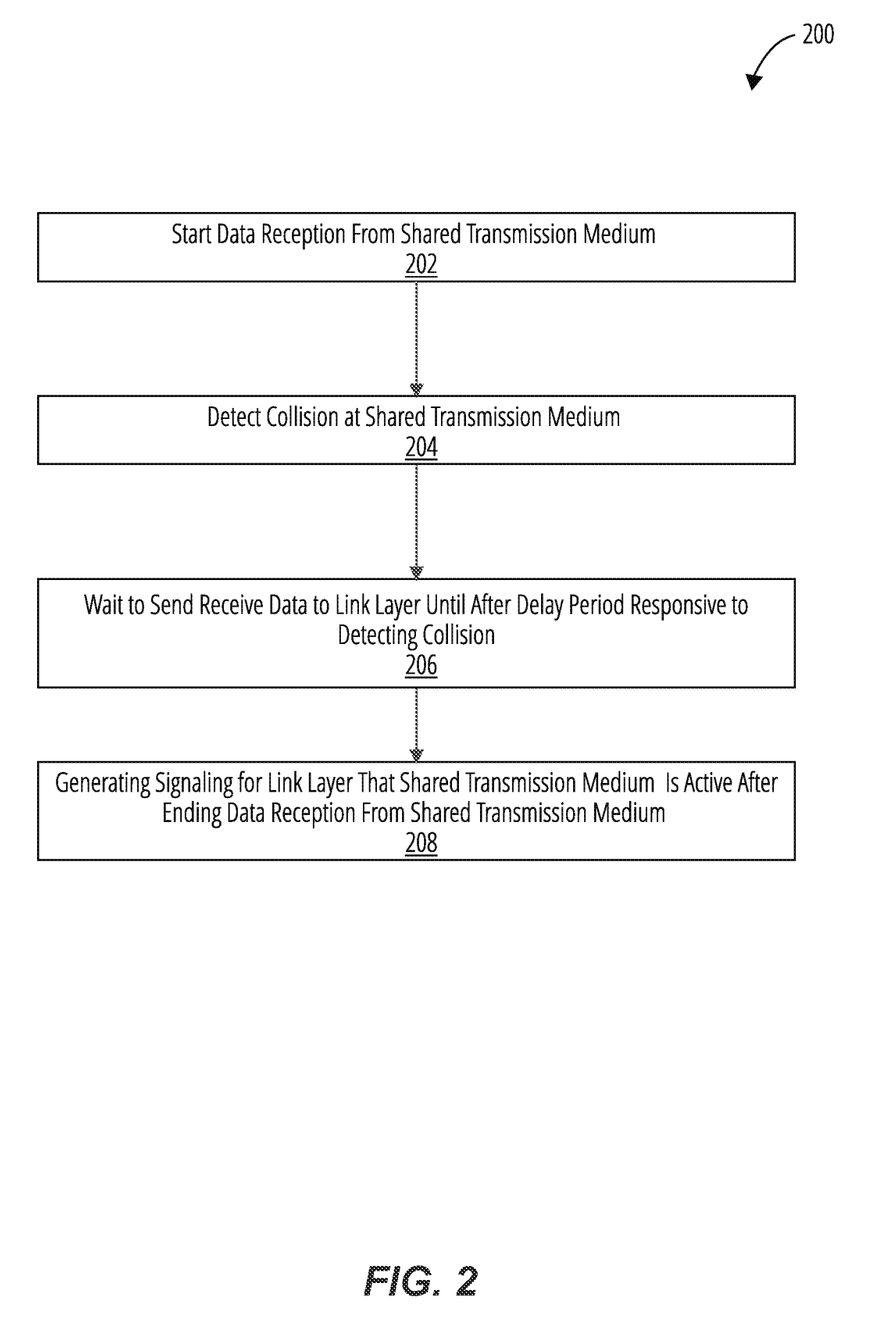
FIG. 2 illustrates a process for data reception handling performed at a physical layer after detecting a collision, in accordance with one or more embodiments.

FIG. 2 shows an embodiment of a process 200 for data reception handling at a physical layer after detecting a collision, for example, at PHY 102 of network segment 100, in accordance with one or more embodiments.

In operation 202, process 200 starts a data reception from a shared transmission medium. In one embodiment, a start of a data reception may be detected because valid data is detected at shared transmission medium 106.

In operation 204, process 200 detects a collision at the shared transmission medium 106. In one embodiment, a collision may be detected in response to detecting the beginning of a data transmission from MAC 104 while valid data is being detected at shared transmission medium 106. In some embodiments, PHY 102 may assert a signal for MAC 104 indicating that a collision was detected and/or that carrier activity was detected at the shared transmission medium 106. In one embodiment, a signal asserted by PHY 102 to indicate that carrier activity was detected may be non-exclusively for signaling carrier activity-stated another way, other information may be indicated by the signal, for example, valid data signaling (for indicating that valid data is available to be received from shared transmission medium 106) may be multiplexed with the carrier activity signaling. In another embodiment, the signal may be exclusively for signaling carrier activity.

In operation 206, process 200 waits to send receive data from PHY 102 to MAC 104 until after a delay period in response to detecting the collision. In some embodiments, while waiting to send receive data to MAC 104, MAC 104 may attempt to transmit a jam message and then back off from transmitting.

In operation 208, process 200 generates signaling from PHY 102 to MAC 104 to indicate that the shared transmission medium is active (i.e., that carrier activity is detected at shared transmission medium 106) after ending (i.e., subsequent to ending) a data reception from shared transmission medium 106. In one embodiment, PHY 102 generates the signaling for a period equal to a delay period of operation 206 less a period corresponding to an inter-frame gap. In another embodiment, PHY 102 generates the signaling for a period equal to a delay period of operation 206.

Some examples of signaling from PHY 102 to MAC 104 associated with operation 208 of process 200 are discussed with reference to FIG. 4, FIG. 5, and FIG. 6.

Figure 3A:
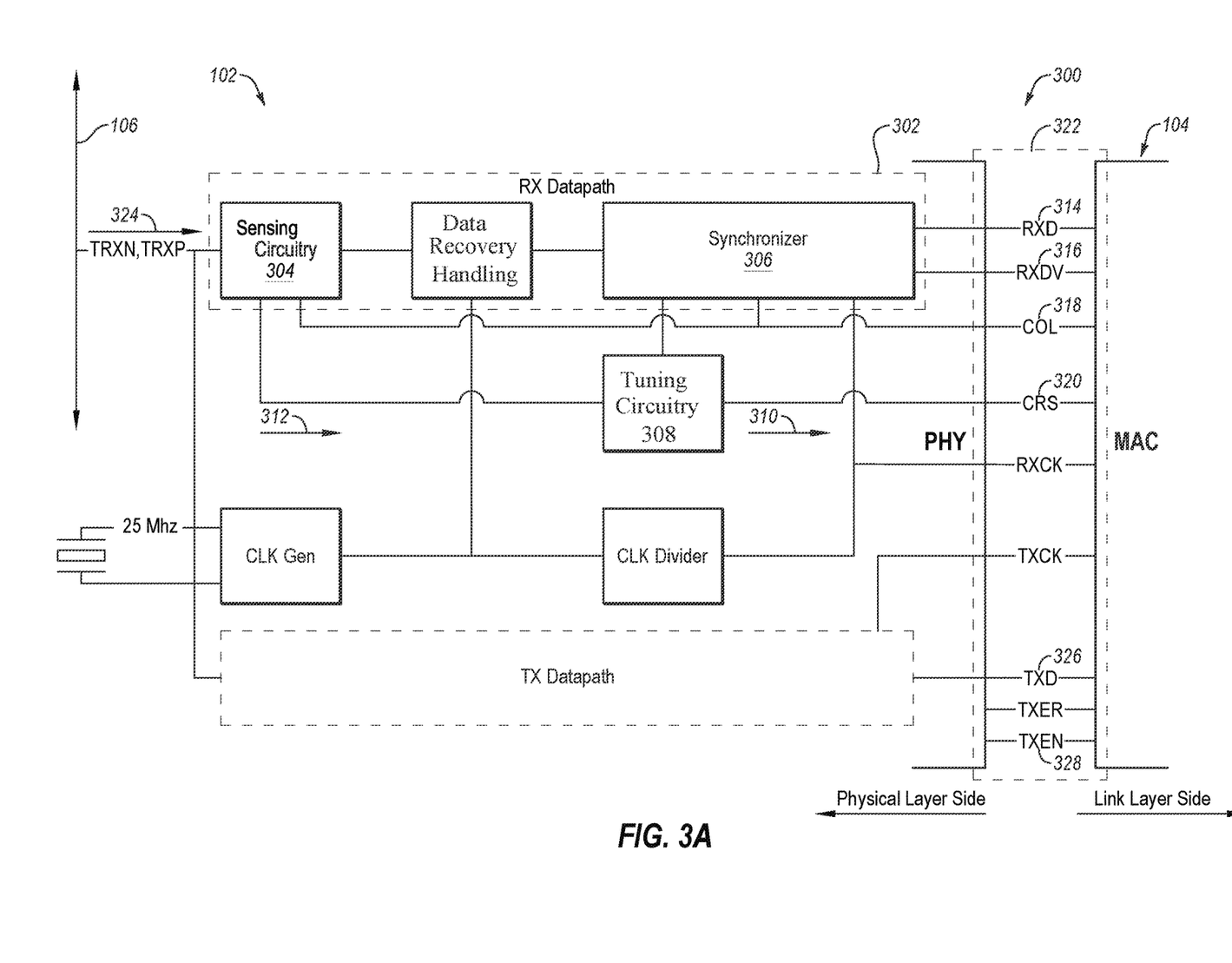
FIG. 3A illustrates a system in accordance with one or more embodiments.

FIG. 3A shows a block diagram of an embodiment of a system 300 that includes an embodiment of PHY 102 that is configured to perform data reception handling in accordance with process 200. In this contemplated example, system 300 includes PHY 102 and MAC 104, which are operatively coupled by interface 322. An interconnect (i.e., wiring and/or conductive paths) operatively couples pins of a physical layer side of system 300 (e.g., of PHY 102) to pins of a link layer side of system 300 (e.g., MAC 104). Notably, lines for carrying various signals between PHY 102 and MAC 104 are shown in FIG. 3A, including without limitation receive data line 314 (RXD), valid receive data line 316 (RXDV), collision line 318 (COL), and carrier sense line 320 (CRS). In the embodiment shown in FIG. 3A, carrier sense line 320 is exclusively for signaling carrier activity of shared transmission medium 106 to MAC 104. In another embodiment, a line may be used for non-exclusively signaling carrier activity to MAC 104 (e.g., consistent with a reduced media independent interface).

In the embodiment shown in FIG. 3A, PHY 102 includes receive datapath 302 and tuning circuitry 308. Receive datapath 302 includes various circuitry for performing functional operations for processing receive data 324. Here, receive datapath 302 includes sensing circuitry 304 and synchronizer 306 (Rx Buffer), as well as circuitry for handling data recovery (e.g., oversampling circuitry, elastic buffers, digital clock-and-data recovery, aligners, decoders, without limitation).

In some embodiments, synchronizer 306 may include a delay line (e.g., a circular buffer, without limitation) for storing delayed receive data. In one embodiment, synchronizer 306 may be configured to store receive data at the delay line for a delay period, and then send the delayed receive data to MAC 104 after the delay period. In one embodiment, the delay line may be configured for a delay period that is a uniform delay period applied to all receive data (which may beneficial if quality of services is a concern).

In some embodiments, in response to a detected collision, synchronizer 306 may be configured to delay sending receive data until it detects that MAC 104 has finished responding to a collision (e.g., responding to a signal sent on collision line 318). In one embodiment, synchronizer 306 may be configured to detect a collision in response to a collision signal from sensing circuitry 304 sent on collision line 318. In another embodiment, synchronizer 306 may be configured to detect a collision in response to a carrier sense signal from sensing circuitry 304 (connection not shown) and a transmit enable signal sent on transmit enable line 328 (connection not shown).

Figure 3B:
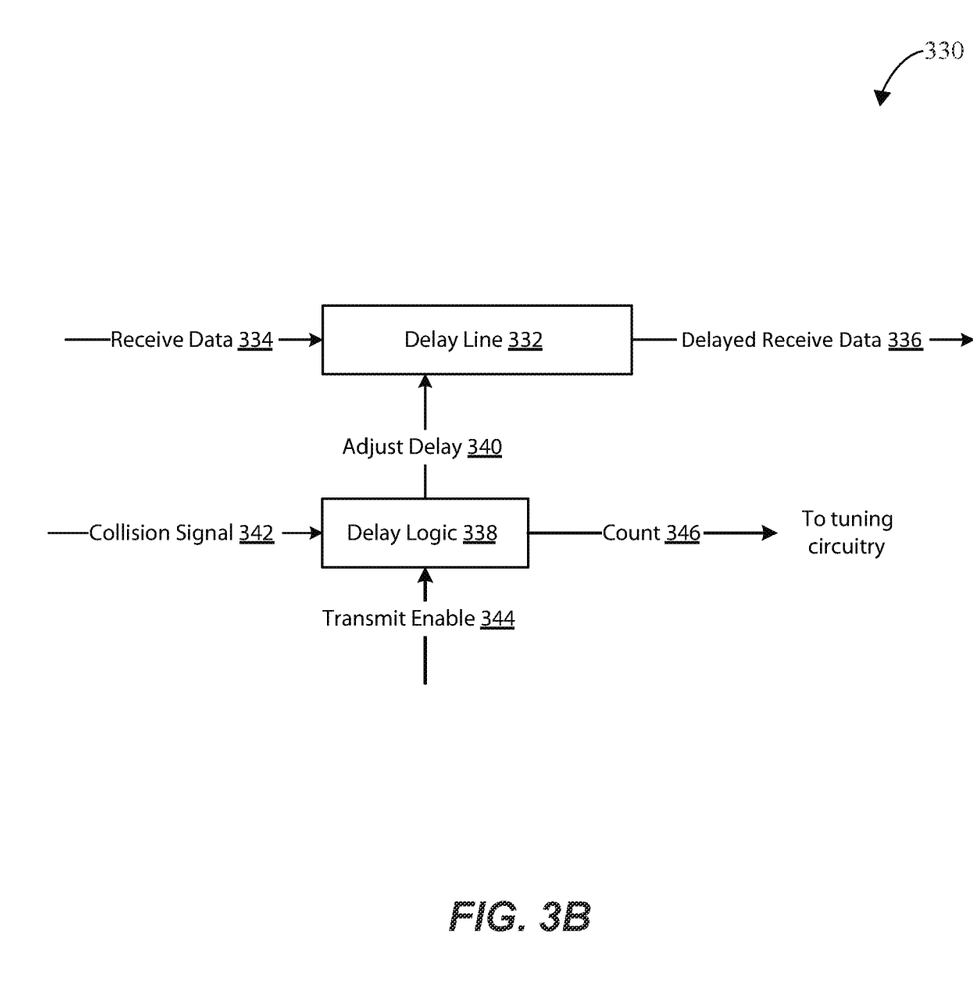
FIG. 3B illustrates a delay circuit in accordance with one or more embodiments.

In one embodiment, synchronizer 306 may be configured to detect that MAC 104 has finished responding to a collision by detecting an end of a jam message sent by MAC 104 on transmit enable line 328 or transmit data line 326 (connections not shown—and which are discussed with reference to FIG. 3B). In one embodiment, synchronizer 306 may be configured to implement a counter and, in response to a detected collision, count for a predetermined period and at the end of the count start sending delayed receive data to MAC 104. Such predetermined period may be equal to, for example, a standard period of time for MAC 104 to defer transmitting in response to a detected collision.

In one or more embodiments, sensing circuitry 304 may be configured to detect carrier activity at shared transmission medium 106 and to generate carrier sense signal 312 in response to detecting carrier activity at shared transmission medium 106. Moreover, sensing circuitry 304 is configured to detect collisions at shared transmission medium 106 and, in response to a detected collision, to generate signals for indicating collisions (i.e., collision signals), including collision signals asserted at collision line 318.

In one or more embodiments, tuning circuitry 308 may be configured, generally, to tune signaling at carrier sense line 320 (e.g., in accordance with process 200). Tuning circuitry 308 may be configured to provide emulated carrier sense signal 310 for tuning signaling at carrier sense line 320, which signaling is received at MAC 104. More specifically, interface 322 may be configured to provide emulated carrier sense signal 310 at carrier sense line 320. Tuning circuitry 308 may be configured to assert emulated carrier sense signal 310 at carrier sense line 320 for a period of time (i.e., an extended period) after a data reception ends (i.e., when shared transmission medium 106 becomes idle), so that MAC 104 stays in a deferral state (i.e., a state in which MAC 104 does not start a new transmit) while PHY 102 finishes moving delayed receive data to receive data line 314.

In one or more embodiments, tuning circuitry 308 may be configured to assert emulated carrier sense signal 310 for an extended period that is based, at least in part, on a delay period, as discussed later with reference to FIGS. 4, 5 and 6.

In some embodiments, tuning circuitry 308 may be configured to enforce a delay period by monitoring one or more of carrier sense 312 and receive datapath 302. In one embodiment, tuning circuitry 308 may be configured to enforce a delay period as a period of time starting when carrier sense 312 is asserted at the beginning of a data reception and ending when delayed receive data begins to be moved to receive data line 314.

In other embodiments, tuning circuitry 308 may be configured to assert emulated carrier sense 312 for an extended period that is equal to a specified period of time, for example, in a case where a delay period is a uniform delay period, as discussed later herein. Non-limiting examples of signal tuning are discussed later with reference to FIGS. 4, 5 and 6.

In one or more embodiments, synchronizer 306 may include a delay circuit for delaying receive data in accordance with one or more embodiments. FIG. 3B shows an embodiment of such a delay circuit, delay circuit 330. In one or more embodiments, delay circuit 330 may include delay line 332 and delay logic 338.

Delay line 332 may be configured, generally, to receive and store receive data 334 for some period of time (e.g., for a delay period) and then output delayed receive data 336. Delay logic 338 may be configured, generally, to initiate a delay at delay line 332. In one embodiment, delay logic 338 may be configured to initiate a delay with adjust delay 340 at delay line 332 in response to collision signal 342 (which may correspond to a collision signal asserted collision line 318). In one embodiment, delay line 332 may be configured to delay receive data 334 for a pre-specified period of time.

In another embodiment, delay line 332 may be configured to delay receive data 334 while adjust delay 340 is being asserted by delay logic 338. In this embodiment, delay logic 338 may be configured to assert adjust delay 340 for a period of time. The period of time may be pre-specified, or, it may correspond to a period of time from when delay logic 338 detects that collision signal 342 is asserted to when delay logic 338 detects that transmit enable 344 (connection not shown in FIG. 3A), which is provided by MAC 104, is de-asserted.

Delay logic 338 may also be configured to send optional count 346 which is representative of the amount of delay time, which may be used by tuning circuitry 308 to enforce a deferral state at the MAC as described herein.

Figure 4:
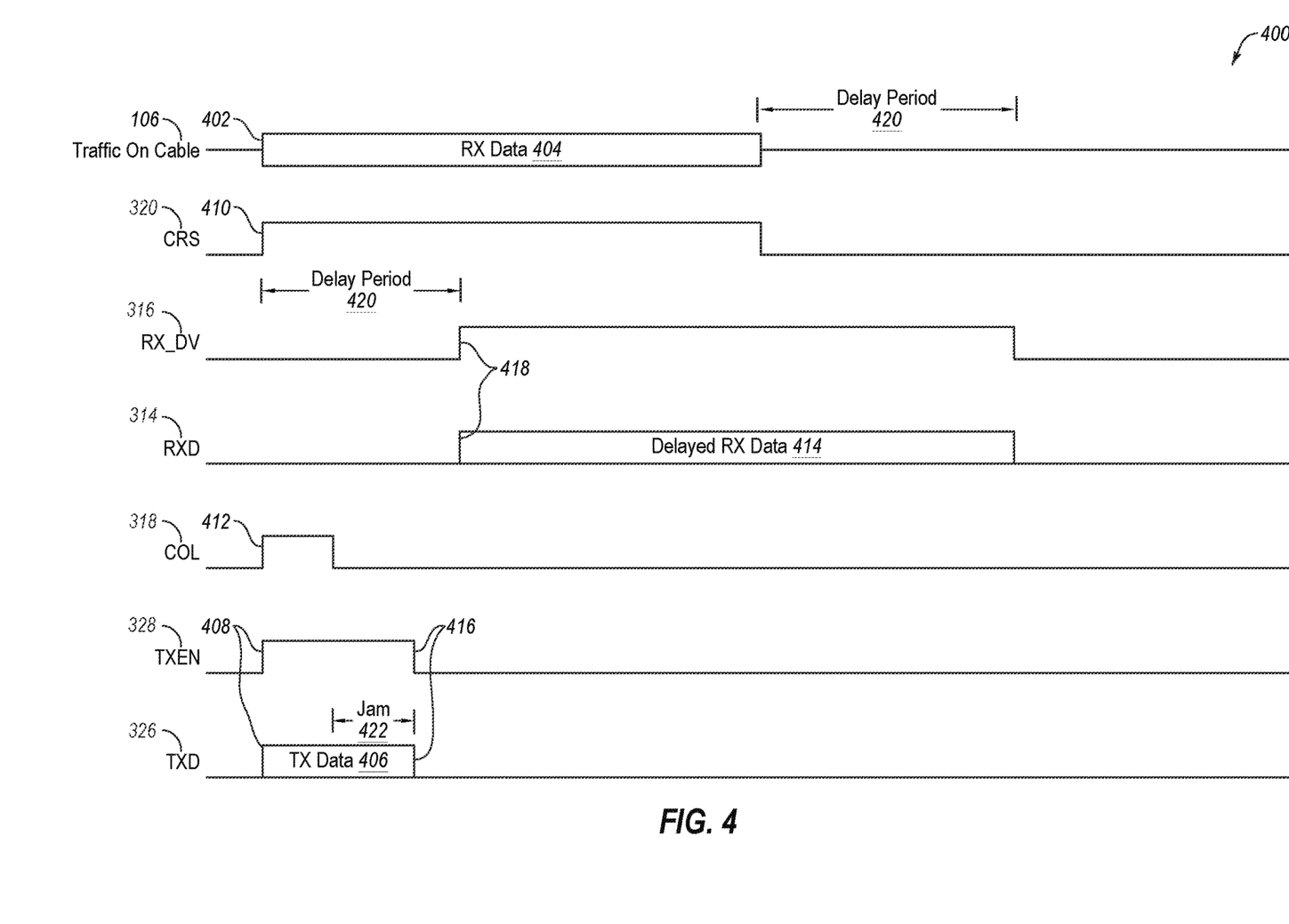
FIG. 4 illustrates a timing diagram in accordance with one or more embodiments.
Figure 5:
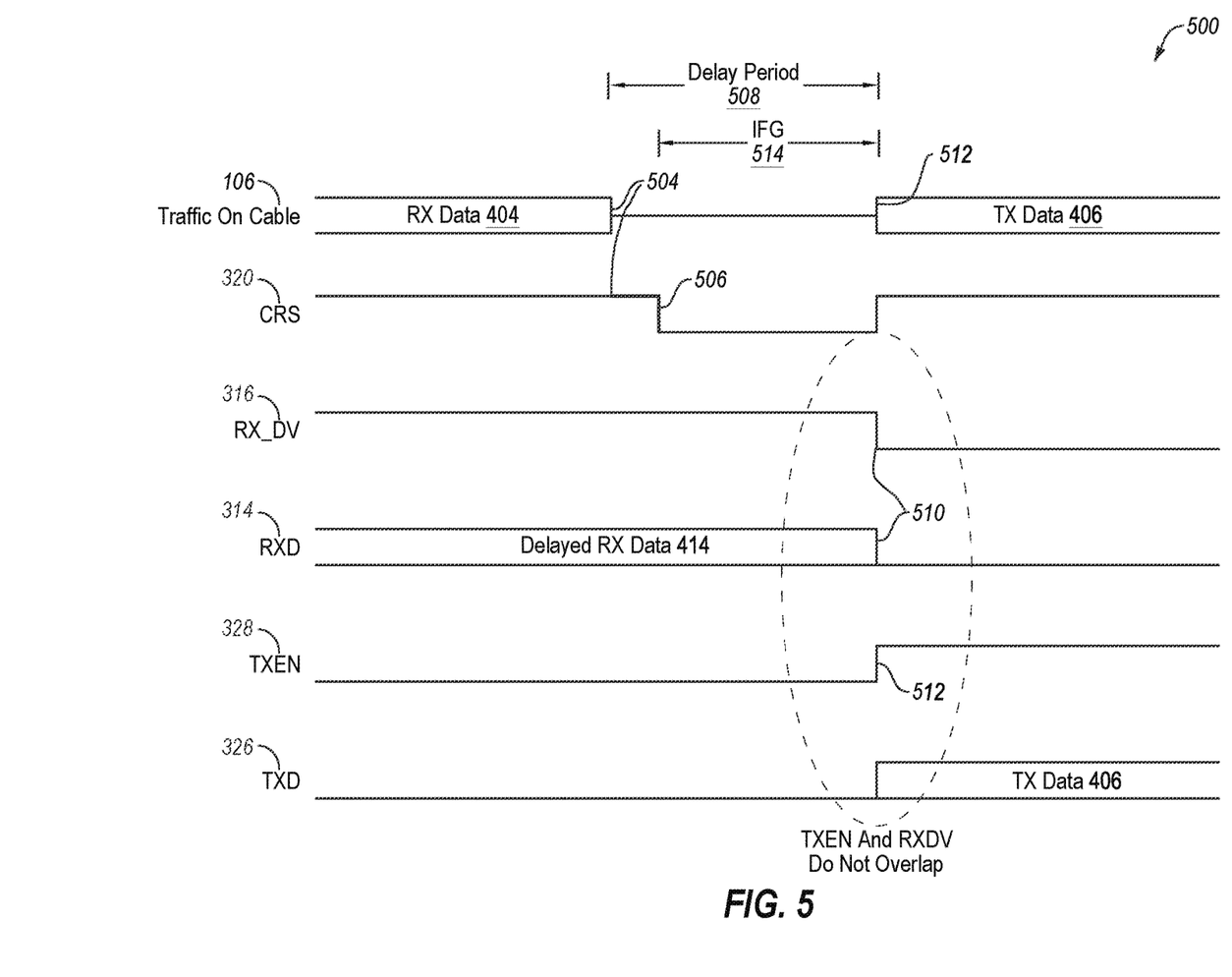
FIG. 5 illustrates a timing diagram in accordance with one or more embodiments.
Figure 6:
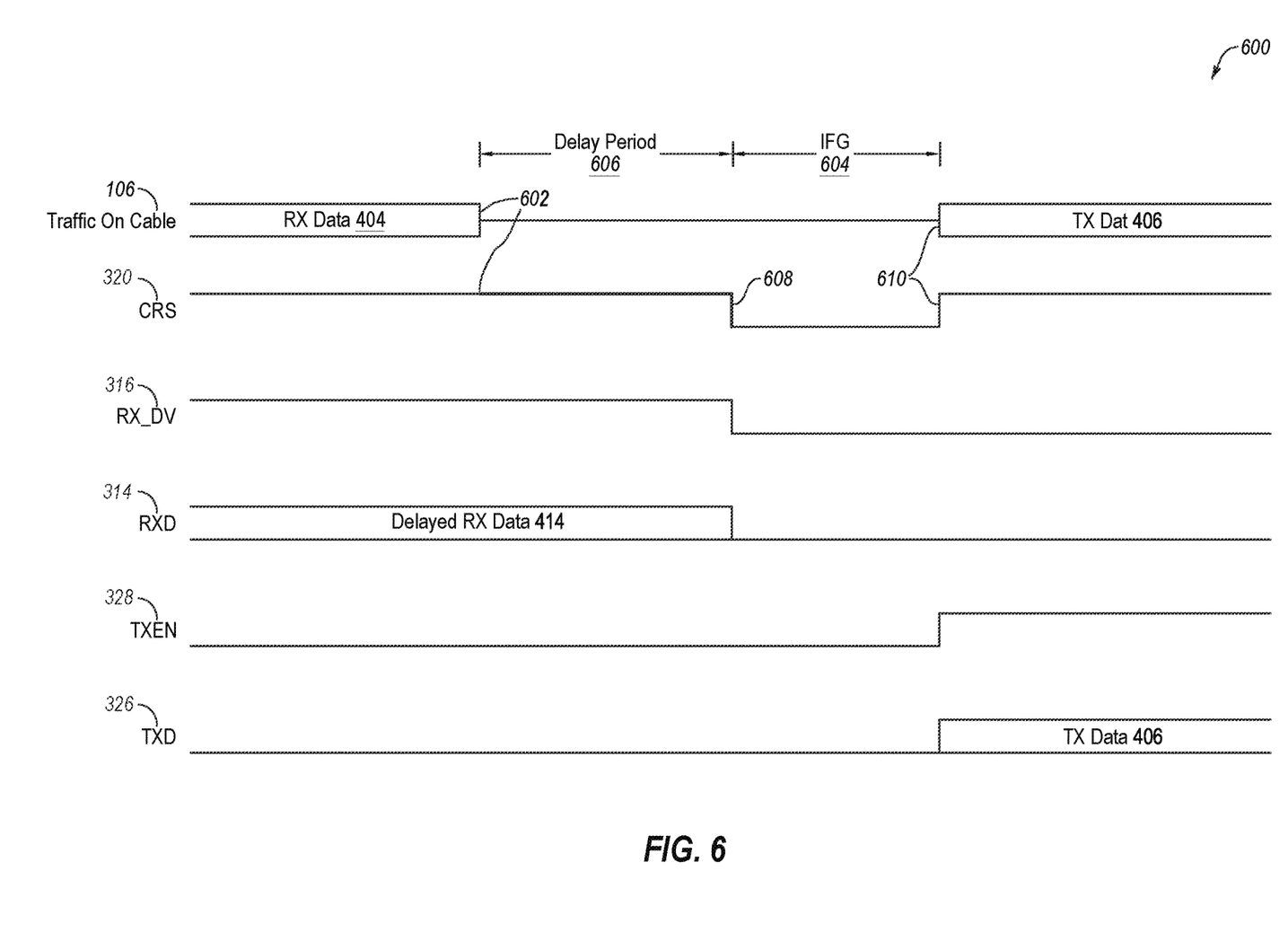
FIG. 6 illustrates a timing diagram in accordance with one or more embodiments.

FIGS. 4, 5 and 6 show timing diagrams for example use cases in accordance with disclosed embodiments. Consistent with convention, time increases from left to right of each diagram. Unless specific timing considerations are noted herein with respect to specific embodiments, changes to timing shown and described with reference to FIGS. 4, 5, and 6 may be made without departing from the scope of the embodiments described in this disclosure and their legal equivalents.

FIG. 4 shows a timing diagram 400 of an example data reception process performed in accordance with one or more embodiments. Shown are signals for shared transmission medium 106 (i.e., a shared transmission medium), carrier sense line 320, valid receive data line 316, receive data line 314, collision line 318, transmit enable line 328, and transmit data line 326. For convenience, in the following discussion signals are described in terms of the aforementioned lines at which respective signals are asserted or de-asserted.

At time 402, valid data, i.e., receive data 404, is available at shared transmission medium 106. At time 408, transmit enable line 328 is asserted (by MAC 104), and substantially contemporaneously, transmit data 406 is provided to transmit data line 326 by MAC 104. At time 410, carrier sense line 320 is asserted responsive to detecting carrier activity at shared transmission medium shared transmission medium 106. Notably, carrier sense line 320 is asserted at about the same time or soon after transmit data 406 is provided. PHY 102, in particular sensing circuitry 304, detects a collision in response to detecting a carrier at shared transmission medium 106 (which detected carrier is propagated to carrier sense line 320 in system 300) and detecting asserted transmit enable line 328 (connection not shown in FIG. 3A) and so asserts collision line 318 at time 412. PHY 102 waits to put receive data 404 on to receive data line 314 during delay period 420. MAC 104 stops sending transmit data 406, sends a jam message at transmit data line 326 during the period of time shown as jam message 422 in FIG. 4, and then backs off from transmitting. At time 416, transmit enable line 328 is de-asserted (also the end of jam message 422), and substantially contemporaneously with time 416, transmit data line 326 goes idle.

At time 418, after the end of delay period 420, PHY 102 asserts valid receive data line 316 and PHY 102 starts to move delayed receive data 414 onto receive data line 314. Notably, delay period 420 is sufficient to ensure that delayed receive data 414 is moved onto receive data line 314 subsequent to transmit enable line 328 is de-asserted.

FIG. 5 shows a timing diagram 500 for an example data handling process performed in accordance with one or more embodiments, and more specifically, shows a media access tuning process being performed after shared transmission medium 106 goes idle and while PHY 102 finishes sending delayed receive data 414 to MAC 104. In a contemplated use case, the data handling process shown in FIG. 5 may occur subsequent to a data reception process in accordance with the embodiment shown in FIG. 4.

At time 504, receive data 404 is no longer present at shared transmission medium 106. In response to an idle shared transmission medium 106, PHY 102, and in particular tuning circuitry 308, asserts carrier sense line 320 from time 504 to time 506 (i.e., for an extended period, as compared to some conventional systems that would de-assert a carrier sense signal in response to an idle shared transmission medium 106). Notably, after a data reception, MAC 104 should wait for a period of time at least equal to an inter-frame gap, which is a standard period of time enforced by PHY 102 to CSMA/CD MAC 104 via CRS signaling or by MAC 104 by its transmission logic, without limitation, between data frames in Ethernet networks before starting a new transmit. So, at time 504 PHY 102 asserts carrier sense line 320 until there is only an inter-frame gap amount of delayed receive data 414 left to send to MAC 104, and then, at time 506, de-asserts carrier sense line 320 for a period substantially equal to IFG 514. Stated another way, carrier sense line 320 is asserted for a period of time equal to delay period 508 less IFG 514. In some embodiments, delay period 508 is substantially the same length of time as a delay period used during a data reception process, for example, delay period 420 of FIG. 4.

Notably, at time 510, valid receive data line 316 is de-asserted and delayed receive data 414 is no longer being sent on receive data line 314—just prior to transmit enable line 328 being asserted at time 512. If the transfer of delayed receive data 414 to MAC 104 were still ongoing when MAC 104 begins a data transmit, that may put MAC 104 in an error state.

FIG. 6 shows a timing diagram 600 for an example data reception process in accordance with one or more embodiments, and more specifically, shows a media access tuning being performed by an embodiment of tuning circuitry 308 after delayed receive data is sent to MAC 104, e.g., as shown in FIG. 4. In this example, carrier sense line 320 is asserted from time 602 to time 608 (which is substantially the same as the delay period 606), and then de-asserted from time 608 to time 610 (which is substantially the same as IFG 604). In some embodiments, delay period 606 is substantially the same length of time as a delay period used during a data reception process, for example, delay period 420 of FIG. 4.

So, whereas in FIG. 5 the gap between the end of receive data 404 and the beginning of transmit data 406 is equal to the delay period 508, in FIG. 6 the gap between the end of receive data 404 and the beginning of transmit data 406 is equal to the sum of delay period 606 and inter-frame gap (IFG) 604. So, for the media access tuning process shown in FIG. 6, after a collision, MAC 104 waits longer before its next transmit opportunity than for the media access tuning process shown in FIG. 5.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Additional non-limiting embodiments of the disclosure include:

Embodiment 1: A method of handling a data reception after detecting a collision at a shared transmission medium, the method comprising: starting a data reception from a shared transmission medium; waiting to send receive data to a link layer until after a delay period; and after ending the data reception from the shared transmission medium, generating signaling for indicating that the shared transmission medium is active.

Embodiment 2: The method according to Embodiment 1, further comprising: after an end of the delay period, starting to send delayed receive data to the link layer.

Embodiment 3: The method according to any of Embodiments 1 and 2, wherein the generating the signaling for indicating that the shared transmission medium is active comprises: asserting, at an output, a first signal for a period substantially equal to the delay period less a period corresponding to an inter-frame gap.

Embodiment 4: The method according to any of Embodiments 1 through 3, wherein the output at which the first signal is asserted is assigned to exclusively signal carrier activity at the shared transmission medium.

Embodiment 5: The method according to any of Embodiments 1 through 4, further comprising: de-asserting, at the output, the first signal for a period substantially equal to the inter-frame gap.

Embodiment 6: The method according to any of Embodiments 1 through 5, further comprising: finishing providing delayed receive data to an output for sending receive data to the link layer after the first signal is de-asserted.

Embodiment 7: The method according to any of Embodiments 1 through 6, further comprising: asserting, at an output, a first signal for a period substantially equal to the delay period.

Embodiment 8: The method according to any of Embodiments 1 through 7, wherein the output at which the first signal is asserted is assigned to exclusively signal carrier activity at the shared transmission medium.

Embodiment 9: The method according to any of Embodiments 1 through 8, further comprising: de-asserting, at the output, the first signal for a period substantially equal to an inter-frame gap.

Embodiment 10: The method according to any of Embodiments 1 through 9, further comprising finishing providing delayed receive data to an output for sending receive data to the link layer at or before the first signal is re-asserted.

Embodiment 11: The method according to any of Embodiments 1 through 10, further comprising: detecting a collision at the shared transmission medium, wherein the waiting to send receive data to the link layer until after the delay period is responsive to the detecting the collision.

Embodiment 12: The method according to any of Embodiments 1 through 11, wherein the waiting to send receive data to the link layer until after the delay period comprises: waiting to send the receive data to the link layer until after a uniform delay period.

Embodiment 13: A system, comprising: an interface configured to operatively couple a physical layer side of the system and a link layer side of the system; a receive datapath configured to move receive data at the physical layer side of the system toward the link layer side of the system, the moving the receive data comprising: starting a data reception from a shared transmission medium; and delaying some of the moving of the receive data until after a delay period, and a tuning circuitry of the physical layer side, the tuning circuitry configured to, after an end of the data reception from the shared transmission medium, generate signaling for indicating that the shared transmission medium is active.

Embodiment 14: The system according to Embodiment 13, wherein the receive datapath comprises sensing circuitry configured to provide a collision signal indicative of a collision at the shared transmission medium, and wherein the receive datapath is configured to delay some of the moving of the receive data until after the delay period responsive to the collision signal.

Embodiment 15: The system according to any of Embodiments 13 and 14, wherein after an end of the delay period the receive datapath is configured to provide a delayed receive data to the interface for sending to the link layer side.

Embodiment 16: The system according to any of Embodiments 13 through 15, wherein the tuning circuitry is configured to generate the signaling for indicating that the shared transmission is active by: asserting, at an output of the interface, a first signal for a period substantially equal to the delay period less a period corresponding to an inter-frame gap.

Embodiment 17: The system according to any of Embodiments 13 through 16, wherein the output of the interface at which the first signal is asserted is for exclusively signaling carrier activity at the shared transmission medium.

Embodiment 18: The system according to any of Embodiments 13 through 17, wherein the period of the first signal is chosen to end before the receive datapath finishes sending delayed receive data.

Embodiment 19: The system according to any of Embodiments 13 through 18, wherein the tuning circuitry is further configured to generate the signaling for indicating that the shared transmission is active by: de-asserting, at the output, the first signal for a period substantially equal to an inter-frame gap.

Embodiment 20: The system according to any of Embodiments 13 through 19, wherein the tuning circuitry is further configured to generate the signaling for indicating that the shared transmission is active by: de-asserting, at the output, the first signal for a period that ends after the receive datapath finishes sending delayed receive data.

Embodiment 21: The system according to any of Embodiments 13 through 20, wherein the receive datapath comprises a delay circuit configured to store delayed received data.

Embodiment 22: The system according to any of Embodiments 13 through 21, wherein the delay circuit comprises: a delay line configured to hold receive data for a period of time; and a delay logic configured to adjust the period of time that the delay line holds receive data.

Embodiment 23: The system according to any of Embodiments 13 through 22, wherein the delay logic is configured to initiate the period of time that the delay line holds the receive data responsive to a collision signal.

Embodiment 24: The system according to any of Embodiments 13 through 23, wherein the delaying some of the moving of the receive data until after the delay period comprises: delaying some of the moving of the receive data until after a uniform delay period.

Embodiment 25: The system according to any of Embodiments 13 through 24, further comprising a system-in-a-package (SiP), wherein the SiP comprises: a physical layer side of the system; a link layer side of the system; and the interface, wherein the interface operatively couples the physical layer side of the system and the link layer side of the system.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method comprising: starting a data reception from a shared transmission medium;
asserting a signal to indicate that the shared transmission medium is active; detecting a collision at the shared transmission medium; sending delayed receive data to a link layer a first time duration after detecting the collision at the shared transmission medium; after ending the data reception from the shared transmission medium, continuing asserting the signal to indicate the shared transmission medium is active; and before de-asserting a signal to indicate availability of delayed receive data for the link layer, de-asserting the signal to indicate the shared transmission medium is active,
wherein the first time duration is equal to or greater than a time duration of collision handling at the link layer.

2. The method of claim 1, comprising, upon detecting a collision at the shared transmission medium: asserting a signal to indicate a detected collision; and providing the signal to indicate a detected collision to the link layer.

3. The method of claim 1, comprising: starting a data transmission at the shared transmission medium at a same time as de-asserting the signal to indicate availability of delayed receive data for the link layer.

4. The method of claim 3, wherein starting the data transmission at the shared transmission medium comprises asserting a signal indicating a data transmission.

5. The method of claim 1, wherein sending delayed receive data to the link layer comprises asserting the signal to indicate availability of delayed receive data.

6. The method of claim 1, wherein the first time duration is of a fixed predetermined duration.

7. The method of claim 1, wherein the first time duration is determined responsive to a de-assertion of a signal to indicate link layer transmission.

8. The method of claim 1, wherein the signal to indicate that the shared transmission medium is active is asserted at an output assigned to exclusively signal carrier activity at the shared transmission medium.

9. The method of claim 1, wherein the de-asserting the signal to indicate the shared transmission medium is active before de-asserting the signal to indicate availability of delayed receive data for the link layer, comprises: momentarily de-asserting the signal to indicate the shared transmission medium is active before de-asserting the signal to indicate availability of delayed receive data for the link layer.

10. A method, comprising:
starting a data reception from a shared transmission medium;
asserting a signal to indicate that the shared transmission medium is active;
detecting a collision at the shared transmission medium;
sending delayed receive data to a link layer a first time duration after detecting the collision at the shared transmission medium;
after ending the data reception from the shared transmission medium, continuing asserting the signal to indicate the shared transmission medium is active; and
before de-asserting a signal to indicate availability of delayed receive data for the link layer, de-asserting the signal to indicate the shared transmission medium is active, wherein a period between de-asserting the signal to indicate availability of delayed receive data for the link layer and de-asserting the signal to indicate the shared transmission medium is active is equal to an inter-frame gap.

11. A system, comprising: an interface to operatively couple a physical layer side of the system and a link layer side of the system; a receive datapath to move receive data at the physical layer side of the system toward the link layer side of the system, wherein the receive datapath to: start a data reception from a shared transmission medium; and delay a move of the receive data until after a delay period at least partially responsive to detection of a collision at the shared transmission medium; and a tuning circuitry of the physical layer side, the tuning circuitry to, after an end of the data reception from the shared transmission medium, assert, at an output of the interface, a signal to indicate that the shared transmission medium is active and momentarily de-assert a signal to indicate availability of delayed receive data for the link layer side after de-asserting the signal to indicate that the shared transmission medium is active,
wherein the receive datapath comprises a synchronizer with a delay circuit for storing delayed receive data,
wherein the synchronizer to store delayed receive data at the delay circuit for a delay period and send delayed receive data to the link layer side after the delay period, and
wherein the synchronizer to send delayed receive data to the link layer side after detecting that the link layer side has finished responding to the detected collision.

12. The system of claim 11, wherein the receive datapath comprises sensing circuitry to generate a collision signal indicative of a collision at the shared transmission medium.

13. The system of claim 11, wherein the receive datapath comprises circuitry for handling data recovery.

14. A system, comprising: an interface to operatively couple a physical layer side of the system and a link layer side of the system; a receive datapath to move receive data at the physical layer side of the system toward the link layer side of the system, wherein the receive datapath to: start a data reception from a shared transmission medium; and delay a move of the receive data until after a delay period at least partially responsive to detection of a collision at the shared transmission medium, and a tuning circuitry of the physical layer side, the tuning circuitry to, after an end of the data reception from the shared transmission medium, assert, at an output of the interface, a signal to indicate that the shared transmission medium is active and momentarily de-assert a signal to indicate availability of delayed receive data for the link layer side after de-asserting the signal to indicate that the shared transmission medium is active, wherein the receive datapath comprises a synchronizer with a delay circuit for storing delayed receive data; and wherein the delay circuit of the synchronizer comprises: a delay line to hold receive data for a period of time; and a delay logic to adjust the period of time that the delay line holds receive data.

15. The system of claim 14, wherein the delay logic is to initiate the period of time that they delay line holds receive data responsive to a collision signal.

* * * * *